United States Patent
Summers et al.

(10) Patent No.: US 12,299,513 B2
(45) Date of Patent: May 13, 2025

(54) METHOD AND SYSTEM FOR ADAPTIVE TRANSCEIVER IN MOBILE DEVICES

(71) Applicant: Visa International Service Association, San Francisco, CA (US)

(72) Inventors: Kuen Summers, San Francisco, CA (US); Philippe Martin, San Jose, CA (US); Yuexi Chen, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 279 days.

(21) Appl. No.: 17/798,815

(22) PCT Filed: Feb. 10, 2021

(86) PCT No.: PCT/US2021/017431
§ 371 (c)(1),
(2) Date: Aug. 10, 2022

(87) PCT Pub. No.: WO2021/163173
PCT Pub. Date: Aug. 19, 2021

(65) Prior Publication Data
US 2023/0136227 A1    May 4, 2023

Related U.S. Application Data (60) Provisional application No. 62/972,511, filed on Feb. 10, 2020.

(51) Int. Cl.
*G06K 19/07* (2006.01)
*G06K 7/10* (2006.01)

(52) U.S. Cl.
CPC ..... *G06K 19/0723* (2013.01); *G06K 7/10297* (2013.01)

(58) Field of Classification Search
CPC .................. G06K 19/0723; G06K 7/10297
USPC .......................................................... 235/492
See application file for complete search history.

(56) References Cited

U.S. PATENT DOCUMENTS 9,710,847 B2 * 7/2017 Kangshang ........ G06Q 30/0635
2012/0295580 A1 * 11/2012 Corner ................ G06Q 20/385
455/410

(Continued)

FOREIGN PATENT DOCUMENTS

| KR | 20160120409 | 10/2016 |
|---|---|---|
| WO | 2015095771 | 6/2015 |
| WO | 2019195676 | 10/2019 |

OTHER PUBLICATIONS

"JoinPay, a Modular Fintech Platform", By MST, Multisystem Technologies, Available online at https://join-pay.com/images/documents/joinpay_presentation_web_eng.pdf, 18 pages.

(Continued)

*Primary Examiner* — Michael G Lee
*Assistant Examiner* — David Tardif
(74) *Attorney, Agent, or Firm* — Kilpatrick Townsend & Stockton LLP (57) ABSTRACT

A method conducted using a mobile device is disclosed. The mobile device comprises a contactless application including a bridging module, a computer readable medium comprising a contactless kernel, wherein the contactless kernel includes a transceiver interface coupled to a processor. The mobile device includes a contactless element coupled to the processor. The method includes receiving a trigger signal indicative of a transaction to be executed. In response to receiving the trigger signal, the contactless kernel transmits first data to the bridging module. The contactless kernel is operable in a first mode of communication. The bridging module transforms the first data in the first mode of communication to first data in a second mode of communication (Continued)

and passes the first data to the contactless element. The contactless element transmits the first data to a user device, and thereafter receives second data from the user device to execute the transaction.

18 Claims, 6 Drawing Sheets

(56) References Cited

U.S. PATENT DOCUMENTS

| | | |
|---|---|---|
| 2016/0055480 A1 | 2/2016 | Shah |
| 2016/0239817 A1 | 8/2016 | Chene |
| 2016/0248479 A1 | 8/2016 | Bellenger et al. |
| 2023/0044616 A1* | 2/2023 | Aabye .................. G06Q 20/34 |
| 2023/0052559 A1* | 2/2023 | Chen .................. G06F 11/3688 |

OTHER PUBLICATIONS

Gnatyk, "Microservices Vs Monolith: Which Architecture Is the Best Choice for Your Business?", Document retrieved from: https://www.n-ix.com/microservices-vs-monolith-which-architecture-best-choice-your-business/#:~:text=While%20a%20monolithic%20application%20is,as%20perform%20the%20specific%20functions, Oct. 3, 2018, 6 pages.

Application No. PCT/US2021/017431, International Search Report and Written Opinion, Mailed on Jun. 7, 2021, 8 pages.

"EMV Contactless Specifications for Payment Systems", Book B, Entry Point Specification, Version 2.1, Mar. 2011, 50 pages.

"Next Generation Kernel System Architecture Overview", EMVCo., Version 1.0, 2nd Generation, Sep. 2014, 65 pages.

Application No. EP21754214.1, Extended European Search Report, Mailed on Apr. 12, 2023, 10 pages.

* cited by examiner

METHOD AND SYSTEM FOR ADAPTIVE TRANSCEIVER IN MOBILE DEVICES

CROSS-REFERENCE TO RELATED APPLICATIONS

This application claims the benefit of the filing date of U.S. Provisional Application No. 62/972,511, filed on Feb. 10, 2020, which is incorporated herein by reference in its entirety for all purposes.

BACKGROUND

Technology has developed to provide payment cards to operate in a contactless manner. A traditional transit terminal or a point-of-sale (POS) terminal, may utilize a short range wireless technology such as Near Field Communication (NFC), Radio Frequency Identification (RFID), etc., to communicate with the payment cards. Typically, in a POS terminal, a kernel is developed to directly communicate with a contactless device e.g., NFC reader, NFC adapter, etc. The kernel is developed, for instance, based on a specific type of hardware platform that hosts the contactless device. As such, the kernel is operable only with respect to the specific type of hardware platform.

Recently, there has been a proliferation in a number of deployed POS terminals. Different POS terminals may employ different hardware platforms and programming interfaces. As such, a distinct kernel is to be developed to communicate with contactless devices deployed on each distinct type of hardware platform. Such an approach is clearly not scalable. Embodiments of the present disclosure address these and other problems, individually and collectively.

BRIEF SUMMARY

By one embodiment, there is provided a method conducted using a mobile device comprising an application including a bridging module, a computer readable medium comprising a contactless kernel, the contactless kernel including a transceiver interface coupled to a processor, the mobile device including a contactless element coupled to the processor. The method includes: receiving a trigger signal indicative of a transaction to be executed. In response to receiving the trigger signal, first data is transmitted by the contactless kernel to the bridging module. The contactless kernel is operable in a first mode of communication. The bridging module transforms the first data in the first mode of communication to the first data in a second mode of communication. The bridging module passes the first data in the second mode of communication to the contactless element, where after the contactless element transmits the first data to a user device. The contactless element receives second data from the user device to execute the transaction.

Another embodiment provides for a mobile device comprising a processor and a non-transitory computer readable medium coupled to the processor, the non-transitory computer readable medium comprising code, executable by the processor, for implementing a method including receiving a trigger signal indicative of a transaction to be executed. In response to receiving the trigger signal, first data is transmitted by the contactless kernel to the bridging module. The contactless kernel is operable in a first mode of communication. The bridging module transforms the first data in the first mode of communication to the first data in a second mode of communication. The bridging module passes the first data in the second mode of communication to the contactless element, where after the contactless element transmits the first data to a user device. The contactless element receives second data from the user device to execute the transaction.

Another embodiment provides for a system comprising a first mobile device and a second mobile device. The first mobile device includes a first contactless kernel comprising a first transceiver interface coupled to a first processor, the first contactless kernel being operable in a first mode of communication, a first contactless element coupled to the first processor and deployed on a first platform of the first mobile device, the first contactless element being operable in a second mode of communication; and a first application including a first bridging module implemented by the first processor and programmed to cause the first processor to transform information received from the first contactless kernel in the first mode of communication to information in the second mode of communication, and transmit information transformed to the second mode of communication to the first contactless element. The second mobile device includes a second contactless kernel comprising a second transceiver interface coupled to a second processor, the second contactless kernel being operable in the first mode of communication, a second contactless element coupled to the second processor and deployed on a second platform of the second mobile device, the second contactless element being operable in a third mode of communication, and a second application including a second bridging module implemented by the second processor and programmed to cause the second processor to transform information received from the second contactless kernel in the first mode of communication to information in the third mode of communication, and transmit information transformed to the third mode of communication to the second contactless element, wherein the first and second contactless kernels are same and the first and second transceiver interfaces are same.

These and other embodiments are described in further detail below, with reference to the figures and detailed description.

DETAILED DESCRIPTION

Embodiments of the present disclosure provide for an adaptive transceiver. Specifically, embodiments of the present disclosure provide for a contactless kernel including a transceiver which is operable as a universal contactless kernel. In other words, the universal contactless kernel is capable of being operable in a plurality of mobile devices, wherein each of the mobile devices may include a contactless element which is deployed on a different hardware platform.

Before discussing the detailed embodiments of the invention, some descriptions of certain terms may be useful.

A "user" may include an individual. In some embodiments, a user may be associated with one or more personal accounts and/or portable devices. The user may also be referred to as a cardholder, account holder, or consumer in some embodiments.

A "user device" may be any suitable device that can be used by a user (e.g., a payment card or a mobile phone). User devices may be in any suitable form. Some examples of user devices include cards (e.g., payment cards such as credit, debit, or prepaid cards) with magnetic stripes or contactless elements (e.g., including contactless chips and antennas), cellular phones, PDAs, personal computers (PCs), tablet computers, and the like. In some embodiments, where a user device is a mobile device, the mobile device may include a display, a memory, a processor, a computer-readable medium, and any other suitable component.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet ora private network. Examples of mobile devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "contactless" communication may be a communication in which data is exchanged between two devices without the need for the devices to be physically coupled. Without limiting the generality of the foregoing, "contactless" communication can include data transmissions by near-field communication (NFC) transceiver, laser, radio frequency, infrared communications, or other radio frequency or wireless communication protocols such as Bluetooth, Bluetooth low-energy (BLE), Wi-Fi, iBeacon, etc.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a payment transaction in which devices can interact to facilitate a payment.

"Interaction data" can include data related to an interaction. In some embodiments, interaction data can be transaction data. Transaction data can comprise a plurality of data elements with data values associated with a transaction. In some embodiments, interaction data can include identifiers, credentials, amounts, dates, times, etc.

An "interaction input message" may be a communication received during an interaction. For example, a message sent by an access device or resource provider device may be an interaction input message for a receiving portable device. One example of an interaction input message can include an APDU (application protocol data unit) command.

An "interaction output message" may be a communication sent during an interaction that is responsive to an interaction input message. One example of an interaction output message can include an APDU response sent by a mobile device, in response to receiving an APDU command.

A "module" can include a set of standardized parts or independent units that can be used to construct a more complex structure. In some embodiments, a module can include any of a number of distinct but interrelated units from which a program may be built up or into which a complex activity may be analyzed.

A "kernel" can include a core of an operating system. In some embodiments, a kernel can include interface routines, security and control functions, and logic to manage a set of commands and responses to retrieve the necessary data from, for example, a mobile device to complete an interaction. In some embodiments, kernel processing can cover the interaction with the portable device between the selection of the portable device application (excluded) and processing of the outcome of the interaction (excluded).

A "resource provider" may be an entity that can provide a resource such as goods, services, information, and/or access to a location (e.g., a parking space, a transit terminal, etc.). Examples of resource providers include merchants, governmental authorities, secure data providers, etc. A resource provider may operate one or more resource provider computers.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorization computer" or "authorizing entity computer" may include any system involved in authorization of a transaction. The authorization computer may determine whether a transaction can be authorized and may generate an authorization response message including an authorization status (also may be known as an authorization decision). In some embodiments, an authorization computer may be a payment account issuer computer. In some cases, the authorization computer may store contact information of one or more users. In other embodiments, the authorization computer may authorize non-financial transactions involving a user. For example, the authorization computer may make an authorization decision regarding whether the user can access a certain resource. In some cases, the authorization computer may be a content provider server computer associated with a content providing entity, which manages one or more resources that may be accessed by a user. The authorization computer may be known as an authorizing entity computer. The authorization computer may include an "access control server" that may be configured to authenticate a user.

An "authorization request message" may be an electronic message that requests authorization for a transaction. In some embodiments, it is sent to a payment processing network and/or an issuer of a payment account to request authorization for a payment transaction. An authorization request message according to some embodiments may comply with ISO 8583, which is a standard for systems that exchange electronic transaction information associated with a payment made by a consumer using a payment device or a payment account. An authorization request message may also comprise additional data elements corresponding to "identification information" including, for example, a service code, a CW (card verification value), a dCW (dynamic card verification value), an expiration date, etc. An authorization request message may also comprise "transaction data," such as any information associated with a current transaction (e.g., the transaction amount, merchant identifier, merchant location, etc.), as well as any other information that may be utilized in determining whether to identify and/or authorize a payment transaction.

An "authorization response message" may be reply to an authorization request message. In some embodiments, an authorization response message may be an electronic message reply to an authorization request message generated by an issuing financial institution (i.e. issuer) or a payment processing network. An authorization response message according to some embodiments may comply with ISO 8583, which is a standard for systems that exchange electronic transaction information associated with a payment made by a consumer using a payment device or a payment account. The authorization response message may include an authorization code, which may be a code that an account issuing bank returns in response to an authorization request message in an electronic message (either directly or through the payment processing network) to a merchant's access device (e.g., point of sale terminal) that indicates approval of the transaction. The code may serve as proof of authorization. As noted above, in some embodiments, a payment processing network may generate and/or forward the authorization response message to the merchant.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

A "token" may be a substitute value for a credential. A token may be a string of numbers, letters, or any other suitable characters. Examples of tokens include access tokens such as payment tokens, data that can be used to access secure systems or locations, etc.

A "server computer" or a "backend server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron, IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Figure 1:
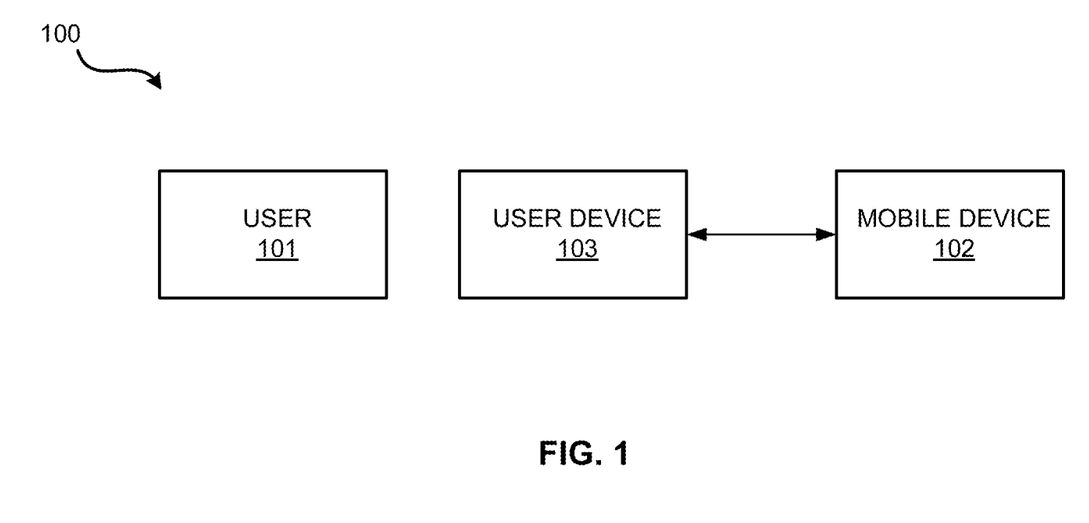
FIG. 1 depicts a block diagram of a system according to an embodiment.

FIG. 1 depicts a block diagram of a system 100 comprising a number of components according to an embodiment of the disclosure. The system 100 comprises a user 101 operating a user device 103, which is communicatively coupled to a mobile device 102. For clarity, a certain number of components are shown in FIG. 1. It is understood that embodiments of the disclosure may include more than one of each component.

In some embodiments, the mobile device 102 may include a plurality of service provider applications such as a mobile wallet application, payment application, or access application that may be provisioned with access data to enable the user device 103 to conduct transactions. For instance, by one embodiment, the mobile device 102 may operate as a point-of-sale terminal and the user 101 may utilize the user device 103 e.g., a credit card or a debit card to pay for goods or services by performing a tap operation of the user device 103 with respect to a mobile device 102. In some embodiments, the user device 103 may be in operative communication with the mobile device 102 through contactless or contact communication. The user device 103 can communicate with the mobile device 102 through a short range contactless mode of communication such as NFC (near field communications), Bluetooth™, Bluetooth™ Low Energy (BLE), Wi-Fi, etc. In some embodiments, the contactless mode of communication may also include the use of audible signals as well as optical signals.

As stated above, the user device 103 according to some embodiments may be in the form of a card e.g., a credit card or a debit card. In such cases, the user device 103 comprises a substrate such as a plastic substrate. A contactless element for interfacing with a data access or data transfer device may be on or embedded within the user device's substrate. The contactless element may include a chip, and may include the capability to communicate and transfer data using near field communications (NFC) technology or other short range communications technology. The user device 103 may also include a memory, which may store user information such as an account number, expiration date, and a user name. Such information may also be printed or embossed on the substrate. The substrate may also include a magnetic stripe, which the user can utilize to perform a swipe operation at a point of sale terminal.

Figure 2:
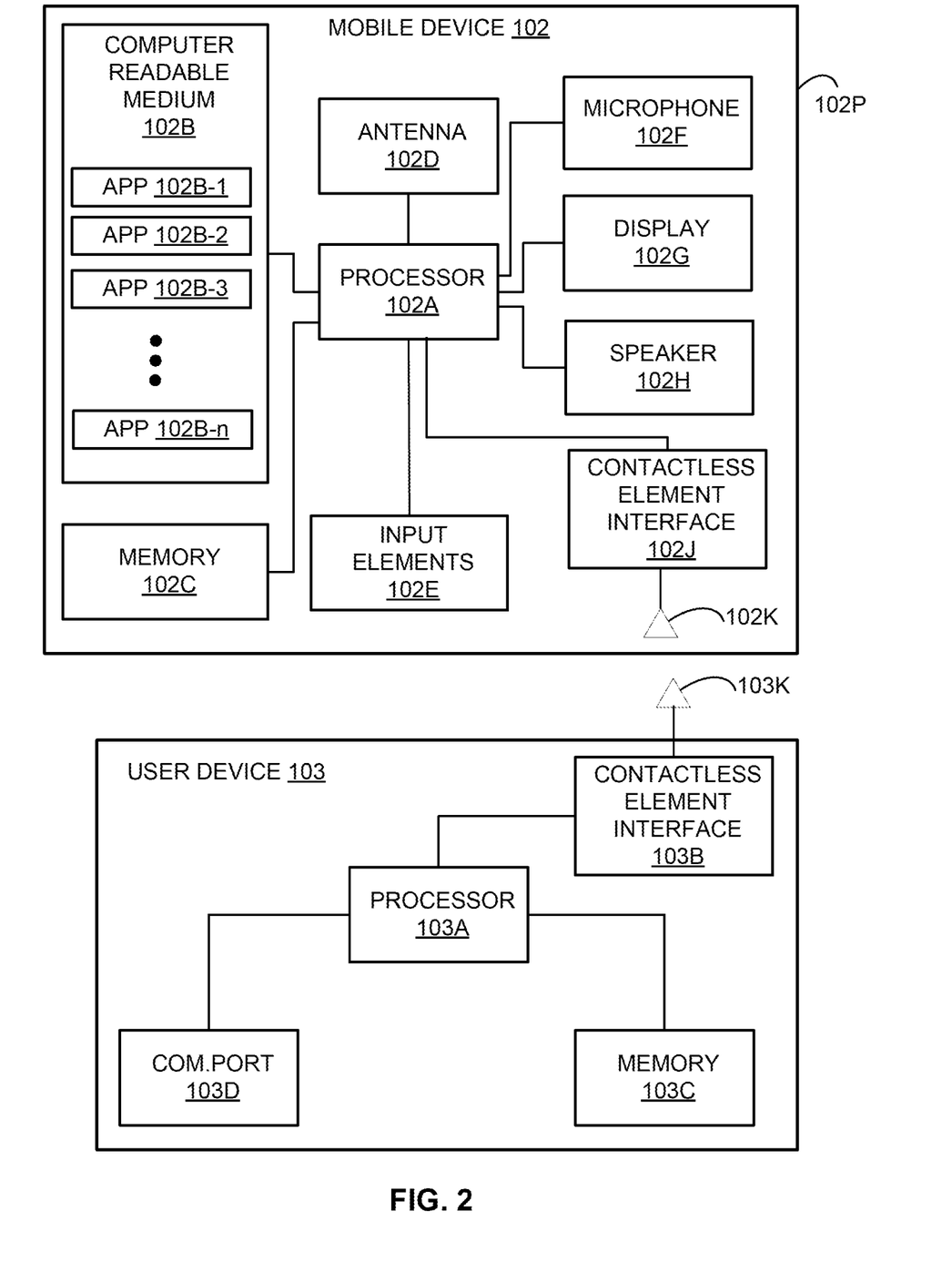
FIG. 2 depicts a block diagram of a mobile device and a user device according to an embodiment.

FIG. 2 depicts a block diagram of a mobile device and a user device according to an embodiment. The mobile device 102 may include a processor 102A (e.g., a microprocessor) for processing the functions of the mobile device 102 and a display 102G to allow a user to view information. The mobile device 102 may further include input elements 102E (e.g., a touchscreen, keyboard, touchpad, sensors such as biometric sensors, etc.), a speaker 102H, and a microphone 102F, each of which is operatively coupled to the processor 102A. A contactless element interface 102J, an antenna 102D, a memory 102C, and a computer readable medium 102B may also be operatively coupled to the processor 102A.

The computer readable medium 102B and the memory 102C may be present within a body 102P. The body 102P may be in the form a plastic substrate, housing, or other structure. In some cases, the memory 102C may be a secure element, and/or may also store information such as access data, including tokens, PANs, etc. Information in the memory 102C may be transmitted by the mobile device 102 to another device using an antenna 102D or contactless element interface 102J. The mobile device 102 may use antenna 102D for wireless data transfer (e.g., using wireless networking protocols such as IEEE (Institute of Electronics Engineers) 802.11) or mobile phone communication (e.g., 3G, 4G, and/or LTE). Antenna 102K of contactless element interface 102J may be configured for sending and receiving wireless signals at a frequency specified by different wireless protocols such as NFC (Near Field Communication), BLE (Bluetooth Low Energy), RFID (Radio Frequency Identifier), or any other suitable form of short or medium range communications mechanism.

In some embodiments, the contactless element interface 102J is implemented in the form of a semiconductor chip (or other data storage element) with an associated wireless transfer (e.g., data transmission) element, such as an antenna. Data or control instructions that are transmitted via a cellular network may be applied to the contactless element interface 102J. Contactless element interface 102J may be capable of transferring and receiving data using a short range wireless communication capability. Thus, the mobile device 102 may be capable of communicating and transferring data or control instructions via both a cellular network (or any other suitable wireless network—e.g., the Internet or other data network) or any short range communications mechanism.

The computer readable medium 102B may comprise code, executable by the processor, for implementing methods according to embodiments. For example, the computer readable medium 102B may comprise code, executable by the processor 102A for implementing a method comprising: receiving a trigger signal indicative of a transaction to be executed. In response to receiving the trigger signal, transmitting first data by a contactless kernel to a bridging module, wherein the contactless kernel is operable in a first mode of communication. The bridging module transforms the first data in the first mode of communication to the first data in a second mode of communication. The bridging module passes the first data in the second mode of communication to the contactless element, where after the contactless element transmits the first data to a user device. The contactless element receives second data from the user device to execute the transaction. The bridging module stated above is a module implemented by the processor 102A and embedded within an application on the mobile device 102. Details related to the bridging module are described later with reference to FIGS. 3A-3C.

The computer readable medium 102B may contain one or more service provider applications 102B-1-102B-n. The service provider applications 102B-1-102B-n can, in conjunction with the processor 102A, allow the mobile device 102 to communicate with various service provider computers. Each application can provide functions provided by its respective service provider. Examples of service provider applications can include digital wallet applications, payment applications (e.g., mobile banking application designed and maintained by a bank or payment processing network), merchant applications (e.g., enabling a user's participation in a loyalty rewards program), transit applications (e.g., storing credit from a prepaid card), ticketing applications (e.g., may store pre-purchased tickets for access to an event or location), etc.

User device 103 includes a processor 103A. The processor 103A may be operatively coupled to a memory 103C, which may comprise a device type identifier, a contactless element interface 103B which may include an antenna 103K, and a communication port 103E. Contactless element interface 103B is configured to communicate with (send and/or receive data) the contactless element interface 102K of the mobile device 102. In one embodiment, the communication port 103D includes hardware to facilitate wireless network communication (e.g., IEEE 802.11). In one embodiment, the user device identifier may be an access device type identifier (ADTI) that identifies one or more functions of the access device (e.g., the ability to process a particular proprietary message format, the ability to provide enhanced services such as a typical payment transaction (e.g., a loyalty rewards program offered by the particular merchant)), and/or a type of behavior that the user device 103 allows and/or expects the mobile device 102 to support.

As stated previously, when a contactless kernel deployed in a mobile device is to communicate with a contactless element of the mobile device, the contactless kernel is developed (ahead of time) based on criteria associated with the contactless element. For example, the contactless kernel may be developed based on a type of mobile platform on which the contactless element is deployed. Thus, there is a one-to-one relationship between the contactless kernel and the contactless element. In other words, the contactless kernel is developed specifically for the type of mobile platform which hosts the contactless element.

In such a scenario, consider the case of having to develop a contactless kernel to communicate with different contactless elements (e.g., three contactless elements, each of which is deployed on a distinct mobile platform). In this case, one would need to develop three different instances of the contactless kernel to communicate with the different contactless elements, respectively. As such the above described technique of deploying contactless kernels is not scalable. In what follows, there is described according to embodiments of the present disclosure, mechanisms to address the above stated scalability issues.

Figure 3A:
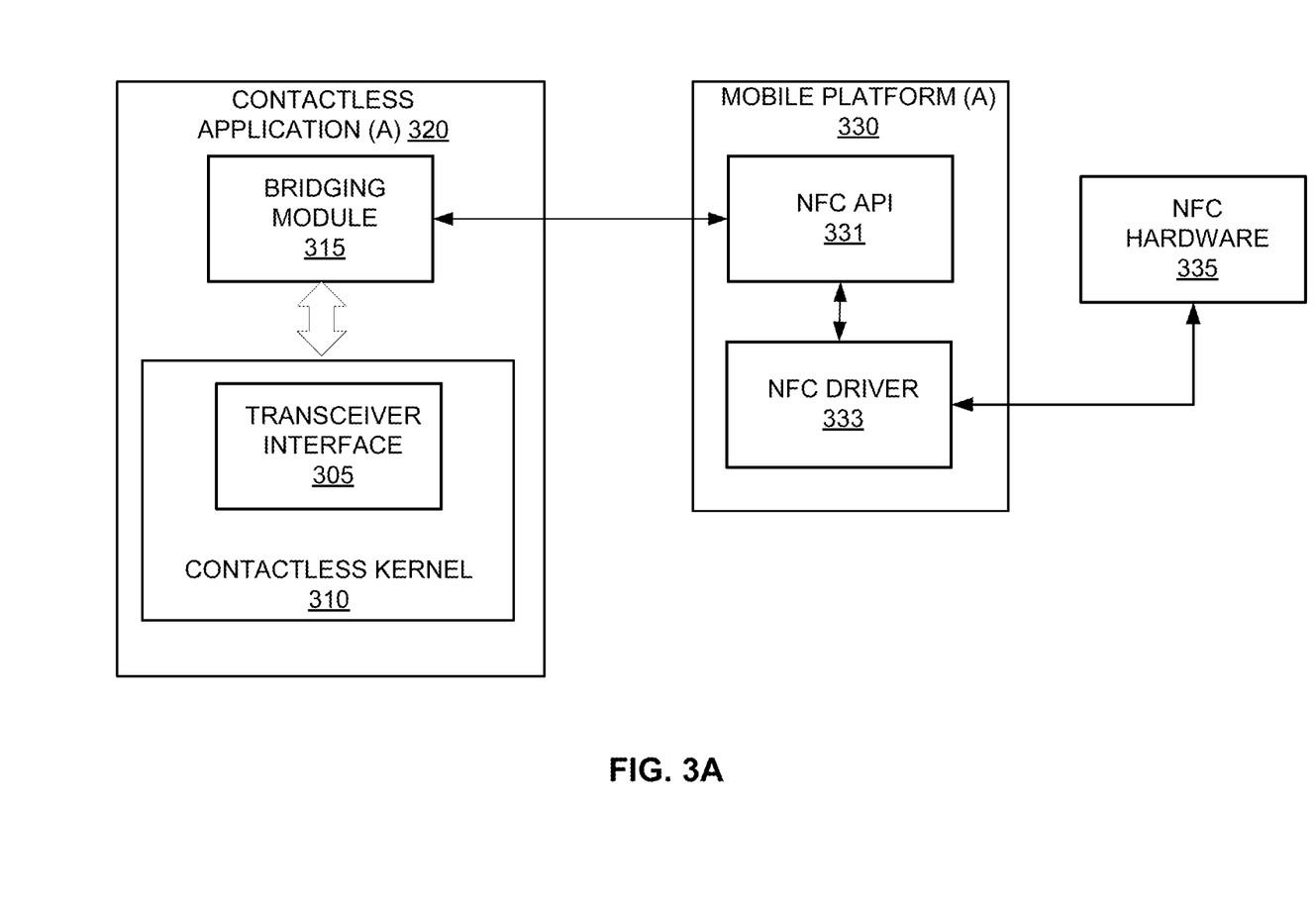
FIGS. 3A-3C depict exemplary configurations of a contactless kernel that is communicatively coupled to a contactless element according to some embodiments.
Figure 3B:
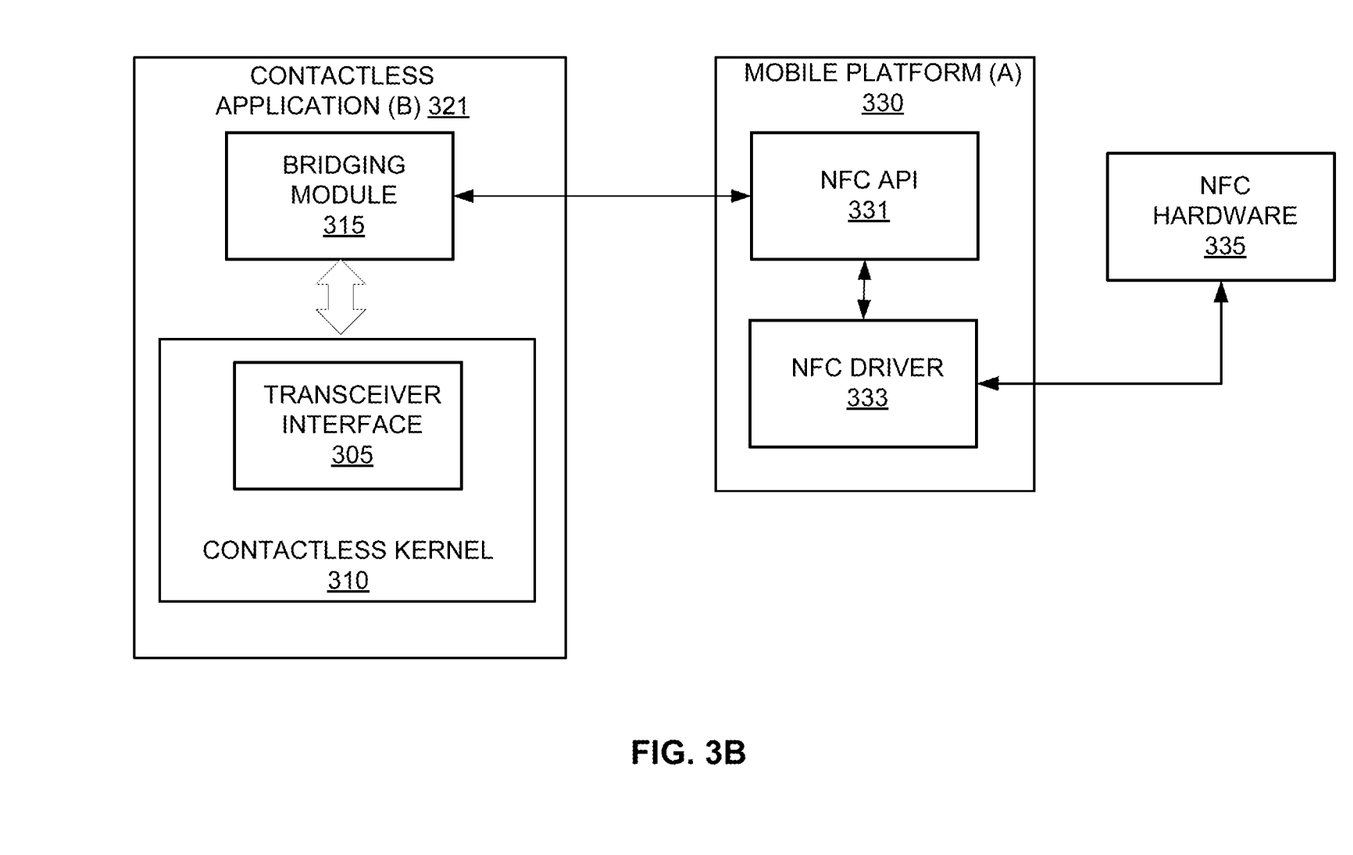
Figure 3C:
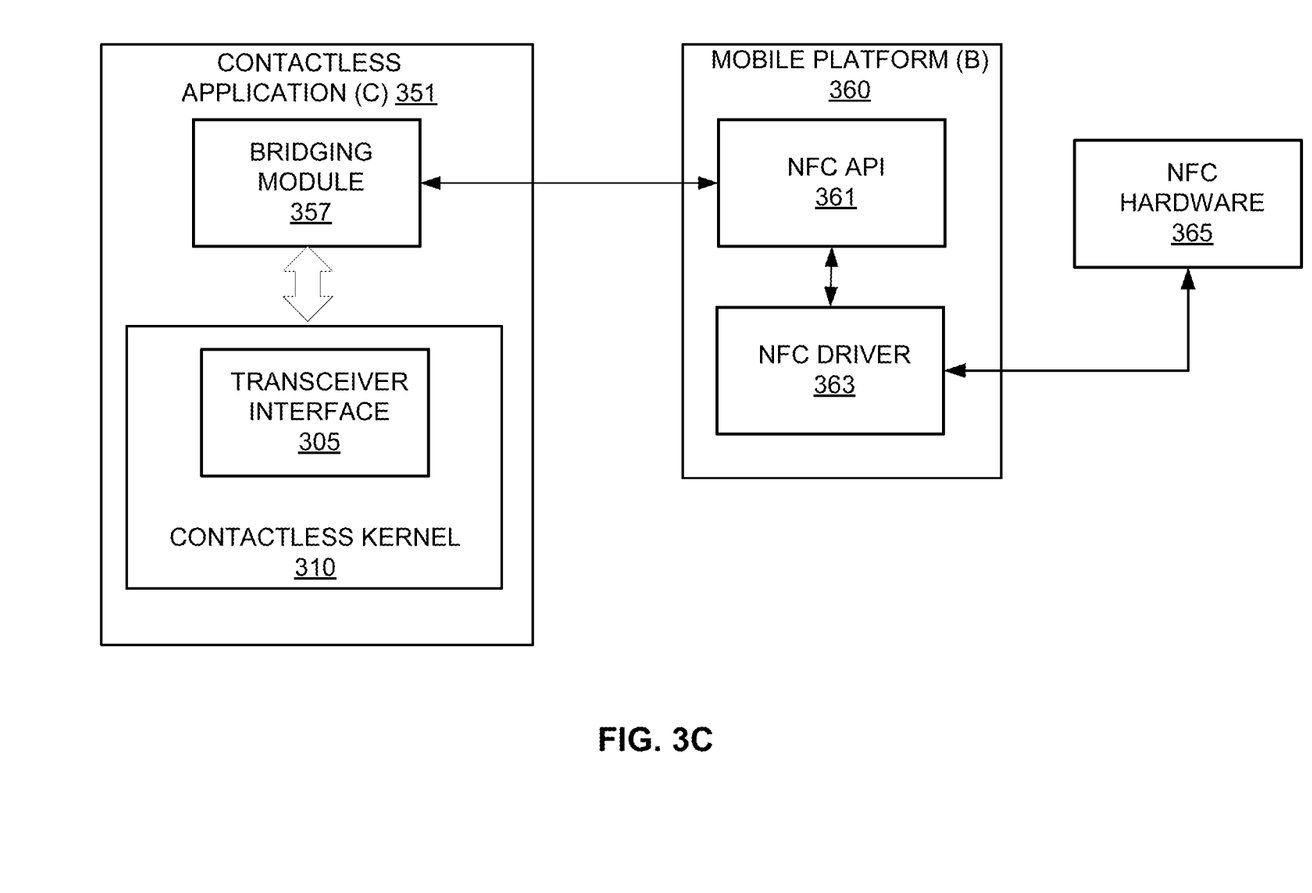

Turning now to FIGS. 3A-3C, there is depicted exemplary configurations of a contactless kernel that is communicatively coupled to a contactless element of a mobile device according to some embodiments.

Referring to FIG. 3A, there is depicted a contactless kernel 310 including a transceiver interface 305. The contactless kernel 310 is configured to communicate with a contactless element deployed on a platform of the mobile device. For example, as shown in FIG. 3A, the contactless element may include an NFC (Near Field Communication) API 331, an NFC driver 333, and NFC hardware 335. The NFC API 331 and the NFC driver 333 may be deployed on a mobile platform 330. For sake of simplicity a type of mobile platform on which the NFC API and NFC driver are deployed is represented as a mobile platform of type A. The contactless element of the mobile device may be configured for sending and receiving wireless signals at a frequency specified by different wireless protocols such as NFC, BLE (Bluetooth Low Energy), RFID (Radio Frequency Identifier), or any other suitable form of short or medium range communications mechanism. For example, the contactless element may exchange messages e.g., application protocol data unit (APDU) messages with a user device, which is communicatively coupled with the mobile device.

Further, the mobile device includes a contactless application (A) 320 e.g., a tap-to-pay application installed therein. The contactless application 320 includes a bridging module 315. The bridging module 315 is configured to implement the transceiver interface 305 and form a communication channel between the contactless kernel 310 and the contactless element deployed on the mobile platform 330 as described below.

The configuration depicted in FIG. 3B differs from the configuration of FIG. 3A in that the bridging module 315 of FIG. 3B resides within another application (B) 321 that is installed on the mobile device. Note that the contactless element (i.e., the NFC API 331, the NFC driver 333, and the NFC hardware 335) are deployed on the same mobile platform 330 as that of FIG. 3A. Turning to the configuration of FIG. 3C, there is depicted another contactless application (C) 351 including a bridging module 357 deployed on a mobile device. The bridging module 357 communicates with a contactless element (i.e., an NFC API 361, NFC driver 363, and NFC hardware 365) which is deployed on a mobile platform (B) 360, which is different than mobile platform 330 of FIGS. 3A and 3B.

In the above described configurations of FIGS. 3A to 3C, the contactless kernel 310 is developed to be operable in a first mode of communication. Specifically, the transceiver interface 305 within the contactless kernel 310 is designed independently of a type of contactless element that the contactless kernel desires to communicate with. Thus, in the configurations of FIGS. 3A to 3C, the contactless kernel is operable to transmit/receive information in the first mode communication. Note that the first mode of communication may be associated with a first messaging format that is utilized by the contactless kernel in communicating information.

In order for the contactless kernel to seamlessly communicate with contactless elements of different types e.g., different NFC API's deployed on different mobile platforms, the bridging module (e.g., 315 or 357) is configured to receive data transmitted from the contactless kernel in the first mode of communication and transform the received data in a second mode of communication. By some embodiments, the bridging module determines the second mode of communication based on a type of contactless element e.g., a type of NFC interface, a type of NFC driver, a type of mobile platform on which the contactless element is deployed on etc. Thus, the bridging module ensures that the information it receives from the contactless kernel in the first mode of communication is transformed into a mode of communication (e.g., the second mode of communication) that is compatible with the contactless element. It is noted that second mode of communication may be different than the first mode of communication. In transforming data from the first mode of communication to the second mode of communication, the bridging module may by some embodiments, transform (i.e., change) the messaging format of the data from the first messaging format (i.e., the format associated with data transferred to the bridging module by the contactless kernel) to a second messaging format which is associated with the second mode of communication. The transformed data in the second messaging format is transmitted by the bridging module to the contactless element.

In this manner, the contactless kernel is a universal contactless kernel capable of being operable in a plurality of mobile devices, each of which includes a different type of contactless element. For example, the contactless kernel operable in a first mode of communication may be deployed in a first mobile device to communicate with a contactless element operable in a second mode of communication (i.e., the contactless element is deployed on a mobile platform of a first type). The same contactless kernel can be deployed on a second mobile device to communicate with a different contactless element that is operable in a third mode of communication i.e., the contactless element is deployed on a mobile platform of a second type, which is different than the first type of mobile platform. As such, by embodiments of the present disclosure, a single contactless kernel can be developed for different mobile devices, independent of the underlying mobile platform and/or application interfaces. Thus, the single contactless kernel (operable in a first mode of communication) along with the bridging module (configured to transform the first communication mode to a different communication mode) can address the previously stated issues of transceiver scalability.

Figure 4:
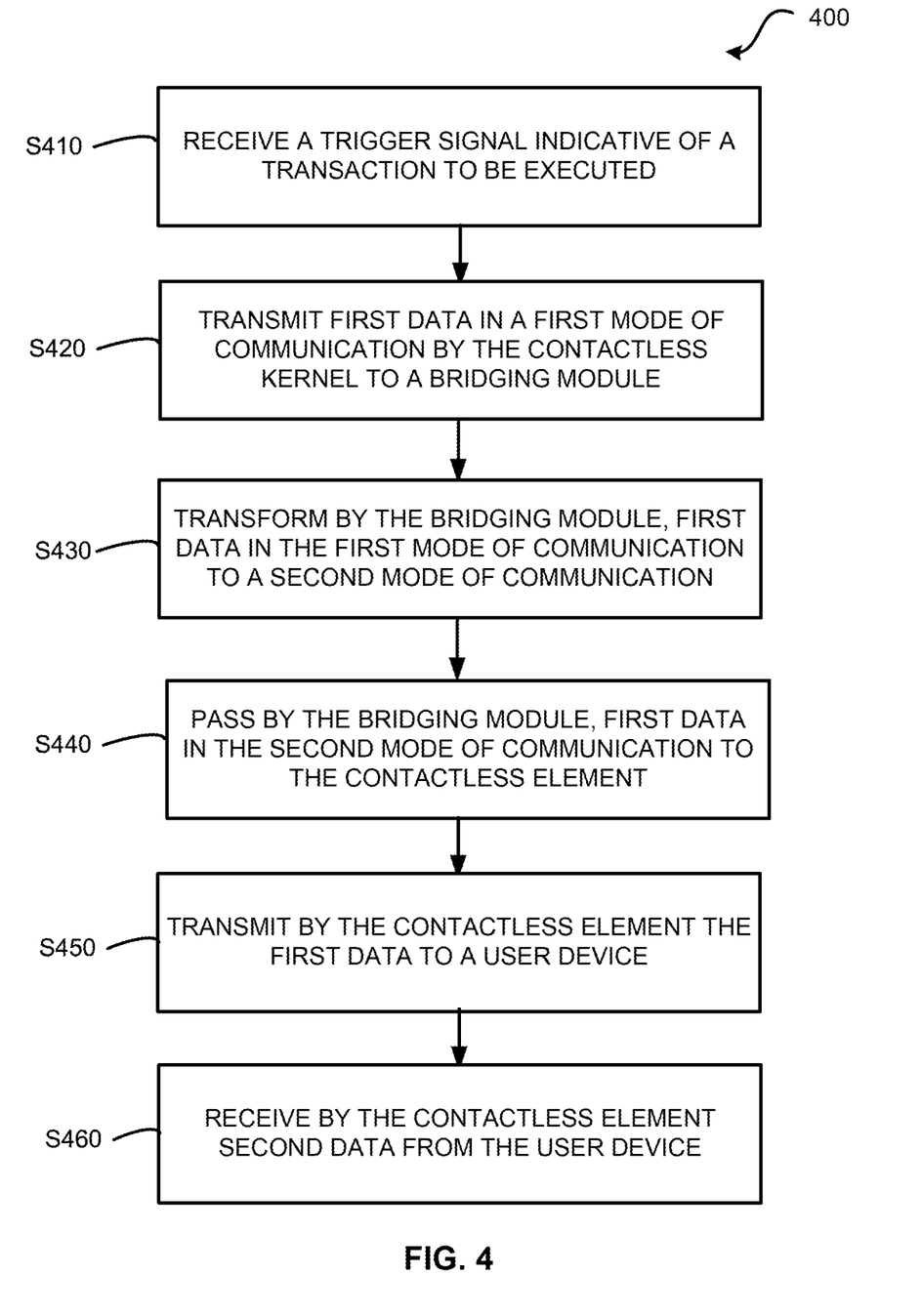
FIG. 4 depicts a flow diagram illustrating a process performed by a mobile device according to an embodiment.

FIG. 4 depicts a flow diagram illustrating a process performed by a mobile device according to an embodiment. Specifically, the process 400 depicted in FIG. 4 corresponds to a mobile device operating as a point of sale terminal and conducting a contactless transaction with a user device e.g., a card such as a credit or a debit card. Furthermore, the mobile device may be a mobile phone such as an Android phone, IOS phone, etc. Additionally, some of the elements in FIG. 2 and FIG. 3A can also be referenced herein in the discussion of FIG. 4 for sake of clarity.

The process commences in step S410, wherein the mobile device receives a trigger signal from the user device. The trigger signal is indicative of a transaction that is to be executed. The trigger signal may correspond to a signal received by the mobile device when the mobile device detects the user device in a close proximity i.e., within a threshold distance from the mobile device. Moreover, as described with reference to FIG. 2, the mobile device and the user device may communicate in a contactless manner via the contactless element interfaces 102J and 103B, respectively. Furthermore, the mobile device may detect the user device, for example, when a user performs a tap operation with a user device i.e., by tapping the user device against a reader in the mobile device.

In response to receiving the signal, in step S420, a contactless kernel transmits first data to a bridging module. The first data may be transmitted in a first mode of communication i.e., in a first messaging format. For example, referring to FIG. 3A, the first data may be transmitted by the contactless kernel 310 to the bridging module 315. The first data may correspond to, for example, a request message indicating a request of certain information from the user's device e.g., an identifier, account information, etc. Note that the contactless kernel 310 desires to communicate with the contactless element (i.e., NFC API 331, NFC driver 333, and the NFC hardware 335) of the mobile device such that the request may be relayed via the contactless element to the user device.

The contactless element of the mobile device may be operable in a second mode of communication i.e., be associated with a second messaging format, which is different than the first messaging format of the contactless kernel. Accordingly, in step S430, the bridging module 315 transforms the first data (i.e., the request) from the first mode of communication to a second mode of communication which is compatible with the contactless element. In step S440, the bridging module 315 passes the transformed first data in the second mode of communication to the contactless element.

The process thereafter moves to step S450, wherein the contactless element transmits the first data (in the second mode of communication) to the user device. It is appreciated that the communication between the mobile device and the user device may be a short range contactless mode of communication such as NFC (near field communications), Bluetooth™, Bluetooth™ Low Energy (BLE), Wi-Fi, etc. In step S460, the contactless element of the mobile device receives second data from the user's device. By some embodiments, the second data may correspond to data sent by the user's device in response to receiving the first data i.e., the request message. Moreover, the second data may correspond to, for example, user information, a payment token etc. The received second data may be forwarded to the bridging module which further transforms the data from the second mode of communication to the first mode of communication. The transformed information may be forwarded by the bridging module to the contactless kernel for further processing the transaction.

Although some of the specific embodiments described above are in the context of a mobile device that can accept or receive data from user devices in the form of payment cards, embodiments of the present disclosure are not limited thereto. For example, embodiments of the present disclosure can be used with mobile devices that can serve as access terminals to allow access to secure locations such as venues (e.g., theaters) and transit terminals, or access to secure data (e.g., a kiosk type device that allows a user to access data held on a remote server).

Described below is an exemplary payment transaction flow associated with a transaction performed by a user by interacting with a mobile device using a user device. Specifically, a user may use a user device e.g., a credit card or a debit card to pay for goods or services by performing a tap operation of the user device with respect to a mobile device. A tap-to-pay application installed in the mobile device executes and completes the transaction as described below.

As described in embodiments of the present disclosure, a plurality of software modules may process the transaction initiated by the user. To complete a payment associated with the transaction, the mobile device may communicate with an authorizing entity computer (operated by an issuer), via a transport computer (operated by an acquirer) and a processing network such a payment processing network. The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments system) which processes authorization requests and a Base II system which performs clearing and settlement services. The payment processing network may use any suitable wired or wireless network, including the Internet.

In response to the user performing a tap operation i.e., by tapping a user device to a mobile device, interaction initiation data is transferred from the user device to the mobile device. The interaction initiation data received by the mobile device may correspond to an identifier of the transaction, a PAN, a payment token, verification value(s), expiration date, etc. The interaction initiation data is received by the mobile device via a contactless interface. The mobile device utilizes a plurality of software modules to process the transaction. For processing a payment associated with the transaction, the mobile device may then generate an authorization request message that includes the information received from the user device (i.e. interaction initiation data) along with additional transaction information (e.g., a transaction amount, merchant specific information, etc.) and electronically transmits this information to a transport computer. The transport computer may then receive, process, and forward the authorization request message to a processing network for authorization.

In general, prior to the occurrence of a credit or debit-card transaction, the processing network has an established protocol with each issuer on how the issuer's transactions are to be authorized. In some cases, such as when the transaction amount is below a threshold value, the processing network may be configured to authorize the transaction based on information that it has about the user's account without generating and transmitting an authorization request message to the authorizing entity computer. In other cases, such as when the transaction amount is above a threshold value, the processing network may receive the authorization request message, determine the issuer associated with the user device, and forward the authorization request message for the transaction to the authorizing entity computer for verification and authorization. Once the transaction is authorized, the authorizing entity computer may generate an authorization response message (that may include an authorization code indicating the transaction is approved or declined) and transmit this electronic message via its external communication interface to processing network. The processing network may then forward the authorization response message to the transport computer, which in turn may then transmit the electronic message comprising the authorization indication to the mobile device. In turn, the mobile device may transmit this information to the user device.

By some embodiment, if the access data is in the form of a token, then the processing network may exchange the token for a real credential (e.g., a PAN). Any authorization request message may then be modified to include the real credential and it may be forward to the authorizing entity computer for verification. The authorizing entity computer can generate an authorization response message with an approval or decline. The authorization response message can be transmitted to the processing network, and the processing network may replace the credential with the token. The processing network may then transmit the authorization response message back to the mobile device. At the end of the day or at some other suitable time interval, a clearing and settlement process between the resource computer, the transport computer, the processing network, and the authorizing entity computer may be performed on the transaction.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method conducted using a mobile device comprising a contactless application including a bridging module and a contactless kernel, the contactless kernel including a transceiver interface coupled to a processor, the mobile device including a contactless element coupled to the processor, the method comprising:
   receiving from a user device, a trigger signal indicative of a transaction to be executed;
   responsive to receiving the trigger signal, transmitting by the contactless kernel included in the contactless application installed on the mobile device, first data to the bridging module, the contactless kernel being operable in a first mode of communication;
   transforming by the bridging module, the first data in a first messaging format associated with the first mode of communication to the first data in a second messaging format associated with a second mode of communication;
   passing by the bridging module the first data in the second messaging format associated with the second mode of communication to the contactless element that is deployed on a platform executed on the mobile device;
   transmitting, by the contactless element, the first data to a user device; and
   receiving, by the contactless element, second data from the user device to execute the transaction, wherein the first messaging format is different than the second messaging format.

2. The method of claim 1, wherein the bridging module determines the second mode of communication based at least in part on a type of the contactless element.

3. The method of claim 1, wherein the contactless element comprises a NFC API, a NFC driver, and an antenna.

4. The method of claim 1, wherein the trigger signal corresponds to the user's device being detected in a proximity of the mobile device.

5. The method of claim 1, wherein the first mode of communication is different than the second mode of communication.

6. The method of claim 1, wherein the contactless kernel is a universal contactless kernel capable of being operable in a plurality of mobile devices, each of which includes a different type of contactless element.

7. The method of claim 1, wherein the user device is a card, and the mobile device is a mobile phone.

8. The method of claim 1, wherein the transaction is an access transaction to access a secure location.

9. A mobile device comprising:
   a processor; and
   a non-transitory computer readable medium coupled to the processor, the non-transitory computer readable medium comprising code, executable by the processor, for implementing a method comprising
   receiving a trigger signal indicative of a transaction to be executed;
   responsive to receiving the trigger signal, transmitting by a contactless kernel included in a contactless application installed on the mobile device, first data to a bridging module, the contactless kernel being operable in a first mode of communication;
   transforming by the bridging module, the first data in a first messaging format associated with the first mode of communication to the first data in a second messaging format associated with a second mode of communication;
   passing by the bridging module the first data in the second messaging format associated with the second mode of communication to a contactless element that is deployed on a platform executed on the mobile device;
   transmitting, by the contactless element, the first data to a user device; and
   receiving, by the contactless element, second data from the user device to execute the transaction, wherein the first messaging format is different than the second messaging format.

10. The mobile device of claim 9, wherein the contactless element includes at least a NFC API, a NFC driver, and an antenna.

11. The mobile device of claim 9, wherein the bridging module determines the second mode of communication based at least in part on a type of the contactless element.

12. The mobile device of claim 9, wherein the first mode of communication is different than the second mode of communication.

13. The mobile device of claim 9, wherein the contactless kernel is a universal contactless kernel capable of being operable in a plurality of mobile devices, each of which includes a different type of contactless element.

14. A system comprising:
   a first mobile device including:
      a first contactless kernel comprising a first transceiver interface coupled to a first processor, the first contactless kernel being operable in a first mode of communication;
      a first contactless element coupled to the first processor and deployed on a first platform of the first mobile device, the first contactless element being operable in a second mode of communication; and
      a first contactless application including a first bridging module implemented by the first processor and programmed to cause the first processor to:
         transform information received from the first contactless kernel included in the first contactless application, from a first messaging format associated with the first mode of communication to information in a second messaging format associated with the second mode of communication; and
         transmit information transformed to the second messaging format associated with the second mode of communication to the first contactless element; and a second mobile device including:
- a second contactless kernel comprising a second transceiver interface coupled to a second processor, the second contactless kernel being operable in the first mode of communication;
- a second contactless element coupled to the second processor and deployed on a second platform of the second mobile device, the second contactless element being operable in a third mode of communication; and
- a second contactless application including a second bridging module implemented by the second processor and programmed to cause the second processor to:
  - transform information received from the second contactless kernel included in the second contactless application, from the first messaging format associated with the first mode of communication to information in a third messaging format associated with the third mode of communication; and
  - transmit information transformed to the third messaging format associated with the third mode of communication to the second contactless element, wherein the first and second contactless kernels are same and the first and second transceiver interfaces are same.

15. The system of claim 14, wherein the first platform of the first mobile device is different than the second platform of the second mobile device.

16. The system of claim 14, wherein the second mode of communication is different than the third mode of communication.

17. The system of claim 14, wherein the first mobile device further includes a third contactless application comprising a third bridging module implemented by the first processor and programmed to cause the first mobile device to:
- transform information received from the first contactless kernel in the first messaging format associated with the first mode of communication to information in the second messaging format associated with the second mode of communication; and
- transmit information transformed to the second messaging format associated with the second mode of communication to the first contactless element.

18. The system of claim 14, wherein the second mobile device further includes a fourth contactless application comprising a fourth bridging module implemented by the second processor and programmed to cause the second mobile device to:
- transform information received from the second contactless kernel in the first messaging format associated with the first mode of communication to information in the third messaging format associated with the third mode of communication; and
- transmit information transformed to the third messaging format associated with the third mode of communication to the second contactless element.

* * * * *